United States Patent
Mumcuyan et al.

(10) Patent No.: US 12,079,282 B2
(45) Date of Patent: Sep. 3, 2024

(54) NAME MATCHING ENGINE BOOSTED BY MACHINE LEARNING

(71) Applicant: ORACLE INTERNATIONAL CORPORATION, Redwood Shores, CA (US)

(72) Inventors: Aras Mumcuyan, Zurich (CH); Iraklis Psaroudakis, Zurich (CH); Miroslav Cepek, Prague (CZ); Rhicheek Patra, Zurich (CH)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 969 days.

(21) Appl. No.: 16/989,306

(22) Filed: Aug. 10, 2020

(65) Prior Publication Data
US 2021/0287069 A1 Sep. 16, 2021

Related U.S. Application Data

(60) Provisional application No. 62/988,800, filed on Mar. 12, 2020.

(51) Int. Cl.
*G06F 40/00* (2020.01)
*G06F 16/903* (2019.01)
(Continued)

(52) U.S. Cl.
CPC .... *G06F 16/90344* (2019.01); *G06F 18/2113* (2023.01); *G06F 18/214* (2023.01);
(Continued)

(58) Field of Classification Search
CPC .... G06F 16/90344; G06F 40/30; G06F 18/22; G06F 18/213; G06F 18/214; G06N 3/045; G06N 5/04
See application file for complete search history.

(56) References Cited

U.S. PATENT DOCUMENTS 7,376,636 B1    5/2008  Wang
7,627,550 B1 *  12/2009 Adams .............. G06F 16/24556
                                              707/999.005

(Continued)

FOREIGN PATENT DOCUMENTS

CN         108804398 A     11/2018

OTHER PUBLICATIONS

M. G. Elfeky, V. S. Verykios and A. K. Elmagarmid, "TAILOR: a record linkage toolbox," Proceedings 18th International Conference on Data Engineering, San Jose, CA, USA, 2002, pp. 17-28, doi: 10.1109/ICDE.2002.994694, 12 pages. (Year: 2002).*

(Continued)

*Primary Examiner* — Barbara M Level
(74) *Attorney, Agent, or Firm* — Hickman Becker Bingham Ledesma LLP

(57) ABSTRACT

Techniques are described herein for a Name Matching Engine that integrates two Machine Learning (ML) module options. The first ML module is a feature-engineered classifier that boosts text-based name matching techniques with a binary classifier ML model. The feature-engineered classifier comprises a first stage of text-based candidate finding, and a second stage in which a binary classifier model predicts whether each string, of the candidate match list, is a match or not. The binary classifier model is based on features from two or more of: a name feature level, a word feature level, a character feature level, and an initial feature level. The second ML module of the Name Matching Engine comprises an end-to-end Recurrent Neural Network (RNN) model that directly accepts name strings as a sequence of n-grams and generates learned text embeddings. The text embeddings of matching name strings are close to each other in the feature space.

24 Claims, 12 Drawing Sheets

EXAMPLES OF SIMILARITY SCORES CALCULATED ON A PAIR OF NAMES 600

| SIMILARITY SCORE TYPE | EXAMPLE SCORES |
|---|---|
| NAME_LEVEL_SIMILARITY-NCD | 0.80 |
| NAME_LEVEL_SIMILARITY-DICE-2 | 0.75 |
| NAME_LEVEL_SIMILARITY-DICE-3 | 0.60 |
| WORD_LEVEL_SIMILARITY-DL-1 | 0.90 |
| WORD_LEVEL_SIMILARITY-JARO_WINKLER-1 | 0.80 |
| WORD_LEVEL_SIMILARITY-LONGEST_COMMON_SUBSEQUENCE-1 | 0.85 |
| CHARACTER_LEVEL_SIMILARITY-DICE-1 | 1.00 |
| CHARACTER_LEVEL_SIMILARITY-DICE-2 | 0.80 |
| INITIAL_LEVEL_SIMILARITY-DICE-1 | 1.00 |

(51) Int. Cl.
  *G06F 18/2113*  (2023.01)
  *G06F 18/214*  (2023.01)
  *G06F 18/22*  (2023.01)
  *G06F 40/30*  (2020.01)
  *G06N 3/045*  (2023.01)
  *G06N 3/08*  (2023.01)
  *G06N 5/04*  (2023.01)

(52) U.S. Cl.
  CPC .............. *G06F 18/22* (2023.01); *G06F 40/30* (2020.01); *G06N 3/045* (2023.01); *G06N 3/08* (2013.01); *G06N 5/04* (2013.01)

(56) References Cited

U.S. PATENT DOCUMENTS

| | | | | |
|---|---|---|---|---|
| 8,423,563 | B2* | 4/2013 | McPeake | G06F 16/90344 382/173 |
| 10,275,450 | B2* | 4/2019 | Diwan | G06F 16/43 |
| 10,726,028 | B2* | 7/2020 | Sun | G06F 16/90344 |
| 11,042,555 | B1* | 6/2021 | Kane | G06F 40/109 |
| 11,182,395 | B2* | 11/2021 | Mirylenka | G06F 16/24578 |
| 2010/0106724 | A1 | 4/2010 | Anderson | |
| 2012/0323877 | A1* | 12/2012 | Ray | G06F 16/9535 707/706 |
| 2014/0156263 | A1* | 6/2014 | Patman Maguire | G06F 40/295 704/9 |
| 2018/0137150 | A1* | 5/2018 | Osesina | G06F 16/215 |
| 2019/0114372 | A1* | 4/2019 | Southgate | G06F 16/90335 |
| 2019/0155916 | A1* | 5/2019 | Huang | G06F 16/9535 |
| 2019/0251122 | A1 | 8/2019 | Rivas et al. | |
| 2020/0201964 | A1 | 6/2020 | Nandakumar et al. | |
| 2020/0210466 | A1* | 7/2020 | Yin | G06F 16/313 |
| 2021/0374479 | A1 | 12/2021 | Zambetti, Jr. et al. | |
| 2022/0050824 | A1 | 2/2022 | Gartner et al. | |

OTHER PUBLICATIONS

C. Conrad, N. Ali, V. Keelj and Q. Gao, "ELM: An Extended Logic Matching Method on Record Linkage Analysis of Disparate Databases for Profiling Data Mining," 2016 IEEE 18th Conference on Business Informatics (CBI), Paris, France, 2016, pp. 1-6, doi: 10.1109/CBI.2016.9, 6 pages. (Year: 2016).*
Eric Bengston and Dan Roth, "Understanding the Value of Features for Coreference Resolution," Proceedings of the 2008 Conference on Empirical Methods in Natural Language Processing, pp. 294-303, Honolulu, Oct. 2008. 2008 Association for Computational Linguistics, 10 pages. (Year: 2008).*
Rosette.com, "Name Matching", https://www.rosette.com/capability/name-matching/#tech-specs, dated 2020, 5 pages.
Mueller et al., "Siamese Recurrent Architectures for Learning Sentence Similarity", Proceedings of the Thirtieth AAAI Conference on Artificial Intelligence (AAAI-16), dated 2016, 7 pages.
Lundberg et al., "A Unified Approach to Interpreting Model Predictions", 31st Conference on Neural Information Processing Systems, dated Nov. 25, 2017, 10 pages.
Le et al., "Low-Resource Machine Transliteration Using Recurrent Neural Networks of Asian Languages", Proceedings of the Seventh Named Entities Workshop Melbourne, dated Jul. 20, 2018, 6 pages.
Kundu et al., "A Deep Learning Based Approach to Transliteration", Proceedings of the Seventh Named Entities Workshop, Melbourne, Australia, dated Jul. 20, 2018, 5 pages.
Ioannou et al., "On Generating Benchmark Data for Entity Matching", J Data Semant, Published online: Nov. 20, 2012, 13 pages.
Dorogush et al., "Fighting Biases with Dynamic Boosting", dated Jun. 28, 2017. 11 pages.
Clinton Gormley and Zachary Tong. "Elasticsearch: The Definitive Guide: A Distributed Real-Time Search and Analytics", Chapter 8, Engine1st. O'Reilly Media, Inc., dated Jan. 2015, 13 pages.
AnHai Doan et al., "Principles of Data Integration", Reading, Massachusetts: Addison-Wesley, dated 2012, Chapter 4, 41 pages.
Dedupe.io, "Dedupe—How it Works", 2.https://dedupe.io/documentation/how-it-works.html, dated 2020, 2 pages.
Frogner et al., "Learning Embeddings Into Entropic Wasserstein Spaces", Published as a conference paper at ICLR, dated May 8, 2019, 12 pages.
Elasticsearch, "What is Elasticsearch?", https://www.elastic.co/elasticsearch, dated 2020, 5 pages.
Elasticsearch, "The Official Distributed Search & Analytics Engine", Elastic, https://www.elastic.co/elasticsearch, dated 2020, 7 pages.
Elasticsearch, "Information Out: Search and Analyze", https://www.elastic.co/elasticsearch, dated 2020, 3 pages.
Elasticsearch, "Elasticsearch Introduction", https://www.elastic.co/elasticsearch, You Know, for Search (and analysis), dated 2020, 2 pages.
Elasticsearch, "Data in: Documents and Indices", https://www.elastic.co/elasticsearch, dated 2020, 2 pages.
Ahmed H. Yousef, "Cross-Language Personal Name Mapping", International Journal of Computational Linguistics Research, vol. 4, issue 4, dated Dec. 2013, 24 pages.
Deselaers et al., "A Deep Learning Approach to Machine Transliteration", Proceedings of the Fourth Workshop on Statistical Machine Translation, dated Mar. 2009, pp. 233-241.
Knoblock, Craig, "Record Linkage", University of Southern California, dated 2009, 45 pages.
Cohen et al., "A Comparison of String Distance Metrics for Name-Matching Tasks", dated 2003, American Association for Artificial Intelligence, (www.aaai.org), 6 pages.
Clinchant et al., "Information-Based Models for Ad Hoc IR", SIGIR'10, dated Jul. 19-23, 2010, Geneva, Switzerland, 8 pages.
Chen, "XGBoost: A Scalable Tree Boosting System", KDD '16, dated Aug. 13-17, 2016, San Francisco, CA, USA, 10 pages.
CatBoost, "CatBoost is a high-performance open source library for gradient boosting on decision trees", https://catboost.ai, dated 2020, 5 pages.
Bilenko et al., "Learning to Combine Trained Distance Metrics for Duplicate Detection in Databases", ACM, Unpublished Technical Note, Feb. 22, 2002, 19 pages.
Arasu et al., "Transformation-based Framework for Record Matching", IEEE, dated Apr. 2008, 10 pages.
Amati et al., "Probabilistic Models of Information Retrieval Based on Measuring the Divergence from Randomness", ACM Transactions on Information Systems, vol. 20, No. 4, Oct. 2002, 33 pages.
Dincer, "IRRA at TREC 2012: Divergence From Independence (DFI)", dated Jan. 2013 Conference: 21th Text REtrieval ConferenceVolume: NIST Special Publication, 6 pages.
Netowl.com, "Name Matching Software", https://www.netowl.com, dated 2020 SRA International, 7 pages.
WCC-Group.com, "Solutions", WCC Gorup Corporate, dated 2020, 6 pages.
Tam et al., "Optimal Transport-based Alignment of Learned Character Representations for String Similarity", darted Jul. 23, 2019, 16 pages.
Schroff et al., "FaceNet: A Unified Embedding for Face Recognition and Clustering", CVPR Paper, dated 2015, 9 pages.
Rosette.com, "Word Embedding for Fuzzy Matching of Organization Names", Blog, https://www.rosette.com/blog/word-embeddings-for-fuzzy-matching-of-organization-names/dated Aug. 2, 2017, 6 pages.
Quinlan, J.R., "Induction of Decision Trees", dated 1986 Kluwer Academic Publishers, Machine Learning 1: dated 1986, 26 pages.
Conroy, Julie, "Entity Resolution and Linking: Enabling Next-Generation Financial Crime Detection", Quantexa, dated Apr. 2019, 39 pages.
Peter Christen, "A Comparison of Personal Name Matching: Techniques and Practical Issues", dated Sep. 2006, Computer Research Science, 5 pages.
IBM.com, "Entity Analytics", https://www.ibm.com/analytics/entity-analytics, last viewed on Nov. 13, 2020, 12 pages.
Novetta, "Novetta Entity Analytics", https://www.novetta.com/products/novetta-entity-analytics/, dated 2020, 8 pages.
Ke et al., "LightGBM: A Highly Efficient Gradient Boosting Decision Tree", 31st Conference on Neural Information Processing Systems NIPS dated 2017, Long Beach, CA, USA, 9 pages.

(56) References Cited

OTHER PUBLICATIONS

Moreau et al., "Robust Similarity Measures for Named Entities Matching", Proceedings of the 22nd International Conference on Computational Linguistics (Coling dated Aug. 2008), pp. 593-600.
Monge et al., "The Field Matching Problem: Algorithms and Applications", KDD-96 Proceedings, www.aaa.org, dated 1996, 4 pages.
Mikolov et al., "Distributed Representations of Words and Phrases and their Compositionality", dated 2013, 9 pages.
Merhav et al., "Design Challenges in Named Entity Transliteration", dated Aug. 7, 2018, 11 pages.
Levenshtein V. I., "Binary Codes Capable of Correcting Deletions, Insertions, and Reversals", Soviet Physics-Doklady, vol. 10., No. 8, dated Feb. 1966, 4 pages.
Koch et al., "Siamese Neural Networks for One-shot Image Recognition", Proceedings of the 32 nd International Conference on Machine Learning, Lille, France, dated 2015, 8 pages.
Zentity.io, "Zentity", Entity Resolution for Elasticsearch, dated 2018, 2 pages.
Oracle.com, "Supercharge Your Anti Financial Crime Program with Advanced Analytics", industries/financial-services/aml-and-financial-crime-compliance/ crime-compliance-studio/, dated 2020, 5 pages.
Rossetti, Kyle et al., Medium, "Basics of Entity Resolution with Python and Dedupe", Jan. 3, 2018, available: https://medium.com/district-data-labs/basics-of-entity-resolution-with-python-and-dedupe-bc87440b64d4.
Oracle Corporation, "Oracle Fusion Middleware Understanding Oracle Enterprise Data Quality", 12c (12.2.1.3.0), Jul. 2018.
Office for National Statistics, "ONS working paper series No. 17—Using data science for the address matching service", 26 pages, retrieved May 24, 2022.
Barrentine, Al, Medium, "Statistical NLP on OpenStreetMap: Toward a machine-interpretable understanding of place", available: https://medium.com/@albarrentine/statistical-nlp-on-openstreetmap-b9d573e6cc86, 20 pages, retrieved May 24, 2022.
Barrentine, Al, Medium, "Statistical NLP on OpenStreetMap: Part 2: training Conditional Random Fields on 1 billion street addresses", available: https://medium.com/@albarrentine/statistical-nlp-on-openstreetmap-part-2-80405b988718, retrieved May 24, 2022.
Abid, Nosheen et al., "DeepParse: Trainable Postal Address Parser", School of Electrical Engineering and Computer Science (SEECS), 9 pages.
Psaroudakis, U.S. Appl. No. 17/733,011, filed Apr. 29, 2022, Non-Final Rejection, Nov. 6, 2023.
Psaroudakis, U.S. Appl. No. 17/733,011, filed Apr. 29, 2022, Final Rejection, Apr. 16, 2024.

\* cited by examiner

FIG. 2

| Name - I | Name - II | Match / Not Match |
|---|---|---|
| Smith John | J. Smith | MATCH |
| Smith John | John-Smith | MATCH |
| John Smith | John-Smith | MATCH |
| John Smith | A. Fernan | NOT-MATCH |
| FernandezAlan | A. Fernandez | MATCH |
| A. Fernan | FernandezAlan | MATCH |
| Diaz Leonardo | John-Smith | NOT-MATCH |
| LeonardoDiaz | Diaz Leonardo | MATCH |
| Diaz Leonardo | L. Diaz | MATCH |

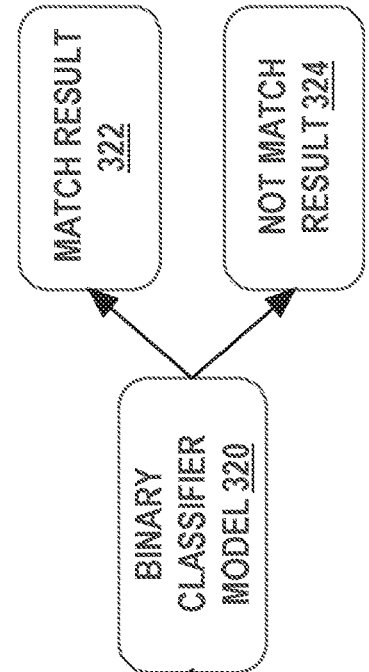
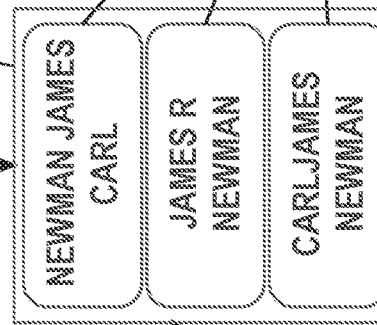
FIG. 3

FIG. 4

402 — EXECUTE A QUERY TO IDENTIFY ONE OR MORE MATCHING NAME STRINGS, FROM A SET OF NAME STRINGS, THAT MATCH A QUERY NAME STRING

404 — IDENTIFY A SET OF FEATURES, FROM A PLURALITY OF FEATURE LEVELS, FOR A PAIR OF NAME STRINGS THAT COMPRISES THE QUERY NAME STRING AND SAID EACH TARGET NAME STRING, WHERE THE PLURALITY OF FEATURE LEVELS COMPRISES TWO OR MORE OF: A NAME FEATURE LEVEL, A WORD FEATURE LEVEL, A CHARACTER FEATURE LEVEL, AND AN INITIAL FEATURE LEVEL

406 — APPLY A MACHINE-LEARNING MODEL AGAINST THE SET OF FEATURES FOR THE PAIR OF NAME STRINGS TO GENERATE OUTPUT THAT COMPRISES A MATCHING PREDICTION FOR THE PAIR OF NAME STRINGS

408 — RETURN RESULTS FROM SAID EXECUTING THE QUERY

FIG. 5

| LEVELS | EXAMPLE PAIR COMPARISON 550 | STRING SIMILARITY FUNCTIONS |
|---|---|---|
| NAME LEVEL 510 | NAME_SIMILARITY("CARL JAMES NEWMAN", "JAMES R NEWMAN") | SORENSEN-DICE, NCD |
| WORD LEVEL 520 | MAX 3 OF CROSS-PRODUCT:<br>-WORD_LEVEL_SIMILARITY ("JAMES", "JAMES")<br>-WORD_LEVEL_SIMILARITY ("NEWMAN", "NEWMAN")<br>-WORD_LEVEL_SIMILARITY ("CARL", "R")<br>-WORD_LEVEL_SIMILARITY ("JAMES", "R")<br>-WORD_LEVEL_SIMILARITY ("NEWMAN", "R")<br>. . . . | DAMERAU LEVENSHTEIN, JARO-WINKLER, LONGEST COMMON SUBSEQUENCE |
| CHARACTER LEVEL 530 | CHARACTER_LEVEL_SIMILARITY ("CARLJAMESNEWMAN", "JAMESRNEWMAN") | SORENSEN-DICE |
| INITIAL LEVEL 540 | INITIAL_LEVEL_SIMILARITY("CJN", "JRN") | SORENSEN-DICE, LONGEST COMMON SUBSEQUENCE |

FIG. 6

EXAMPLES OF SIMILARITY SCORES CALCULATED ON A PAIR OF NAMES 600

| SIMILARITY SCORE TYPE | EXAMPLE SCORES |
|---|---|
| NAME_LEVEL_SIMILARITY-NCD | 0.80 |
| NAME_LEVEL_SIMILARITY-DICE-2 | 0.75 |
| NAME_LEVEL_SIMILARITY-DICE-3 | 0.60 |
| WORD_LEVEL_SIMILARITY-DL-1 | 0.90 |
| WORD_LEVEL_SIMILARITY-JARO_WINKLER-1 | 0.80 |
| WORD_LEVEL_SIMILARITY-LONGEST_COMMON_SUBSEQUENCE-1 | 0.85 |
| CHARACTER_LEVEL_SIMILARITY-DICE-1 | 1.00 |
| CHARACTER_LEVEL_SIMILARITY-DICE-2 | 0.80 |
| INITIAL_LEVEL_SIMILARITY-DICE-1 | 1.00 |

$$A \circ B = A_X {}^* B_X + A_Y {}^* B_Y + A_Z {}^* B_Z$$

$$A \circ B = |A| {}^* |B| {}^* \cos(\theta)$$

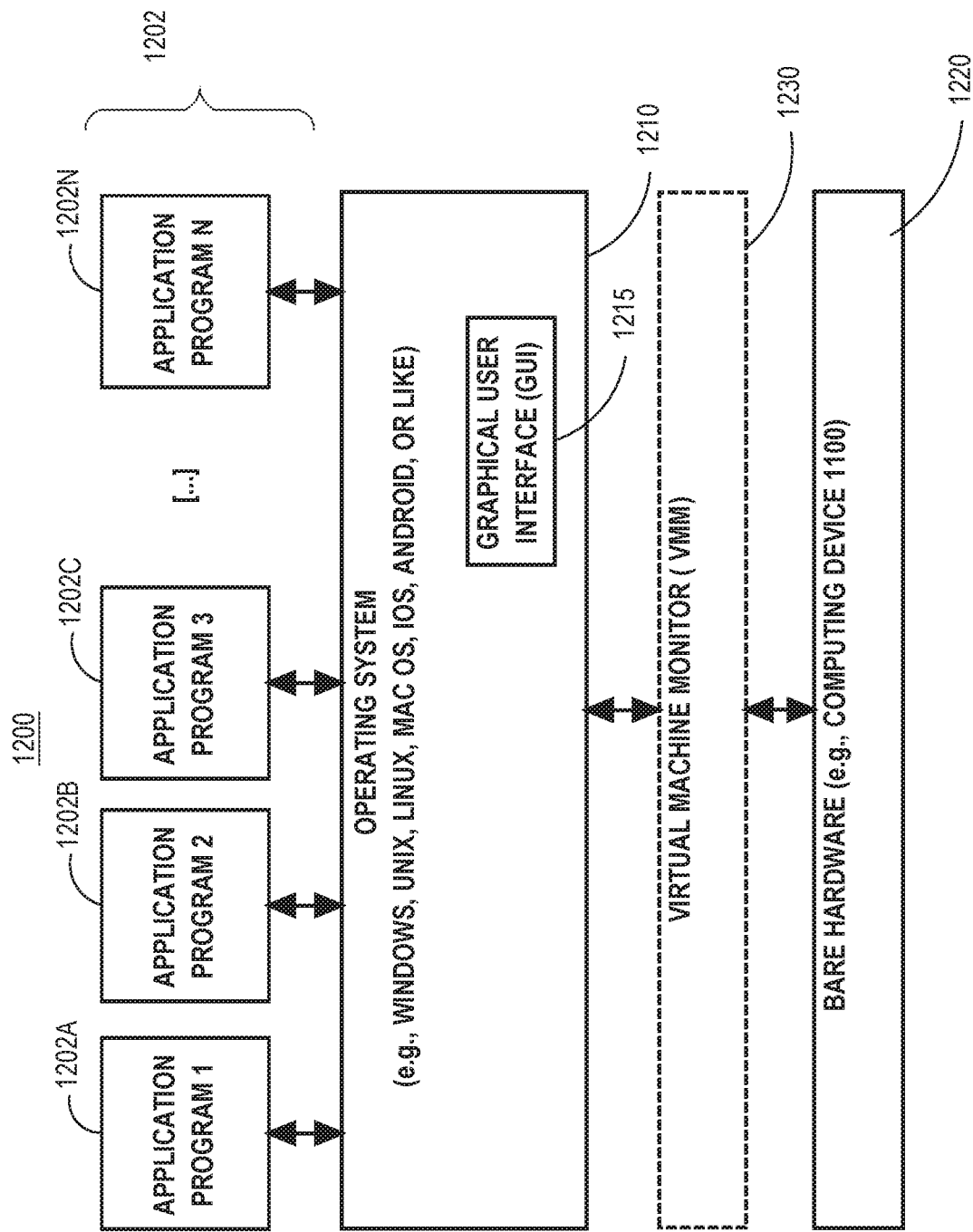

NAME MATCHING ENGINE BOOSTED BY MACHINE LEARNING

CROSS-REFERENCE TO RELATED APPLICATIONS; BENEFIT CLAIM

This application claims the benefit of Provisional Appln. 62/988,800, filed Mar. 12, 2020, the entire contents of which is hereby incorporated by reference as if fully set forth herein, under 35 U.S.C. § 119(e).

FIELD OF THE INVENTION

The present invention relates to Entity Resolution, and, more specifically, to a name matching engine that utilizes machine learning to match names associated with entities in connection with Entity Resolution.

BACKGROUND

Entity Resolution (ER), or Entity Matching, amounts to comparing entity information (e.g., for person-type entities, company-type entities, etc.) within the same or different datasets with the purpose of identifying matching entity entries, which refer to the same entity. While comparing entity information, ER engines generally consider a plethora of data fields with various data types. Entity entries are considered to be a match when information within one or more significant data fields match. For example, when resolving person-type entity entries, significant fields store name strings, phone numbers, physical address strings, email address strings, social security numbers, etc.

The name field of an entity is one of the most significant fields considered during ER. Thus, the accuracy of the name comparison performed by an ER engine affects the accuracy of match/non-match designations determined by the engine. However, name comparison can be complicated by differences in the name strings representing a given entity across various entity entries. For example, one version of a name string may have all words written out and another version of the name string may include an initial to represent one of the words of the name, or may be missing one of the name words altogether. Further, the ordering of the words in two versions of the same name may differ, one of the versions of a name string may have a typographical error, or may include special characters and/or punctuation that are not present in another other version of the name string. Furthermore, one version of a name string may be represented using one script or set of character codes, and another version of the name string may be represented using another script or set of character codes.

One way to compare name strings across entity entries is by using hand-crafted name heuristics. However, such heuristics depend on the expertise of the human creating the rules, and may not be as extensive as required to properly identify all name matches for a given application. Furthermore, creating and updating hand-crafted name heuristics is generally very expensive.

Name strings may also be compared using automatic text-based comparison techniques. For example, a text-based comparison technique involves automatically parsing two name strings and producing a result value that reflects the determined textual similarity between the strings. One kind of text-based comparison technique involves generating phonetic keys, using a Soundex phonetic algorithm, for each name string being compared. This technique identifies matching name strings based on the strings having the same (or similar) phonetic keys. However, some common differences between versions of the same name (such as word transposition, encoding in different character sets, presence of initials in names, omission of name words, etc.) can cause the text of two strings to be very different, notwithstanding the strings representing versions of the same name. Thus, because of such differences, automatic text-based comparison techniques are liable to miss identification of many name matches.

Machine Learning (ML) techniques may be used to boost automatic text-based comparison techniques. For example, during a first stage, a text-based comparison technique is run over a database of name strings to collect candidate matches for a given query name string. In a second stage, a trained statistical ML model uses text embeddings to predict a match score for pair of name strings comprising a given candidate name string, from the first stage, and the query name string. Analyzing pairs of name strings for similarity based on text embeddings allows for fuzzy name matching, which adjusts the similarity score, originally assigned based on the first stage search, by accounting for synonyms within the two name strings being analyzed.

However, while fuzzy (or synonym-based) matching is helpful for some types of entities, such as corporate-type entities, synonym-based name matching is less helpful for other types of entities, such as person-type entities. Furthermore, the ML-based boosting of automatic text-based comparison techniques described above fails to overcome deficiencies of the text-based comparison technique with regard to common issues with name strings, such as transposed words, spelling errors, varying character encoding, and typos.

As such, it would be beneficial to utilize machine learning to overcome common issues in name strings and increase the likelihood of matching name strings across entity entries, which would increase the accuracy of ER engines.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 2 depicts an example golden dataset with name strings from person-type entities.

FIG. 3 depicts a feature-engineered classifier comprising a first stage with a candidate finder and a second stage with a binary classifier model.

FIG. 4 depicts a flowchart for using a feature-engineered classifier to predict a match for a query name.

FIG. 5 depicts a table with information regarding various feature levels for the binary classifier model.

FIG. 6 depicts example similarity scores for a feature vector with scores from multiple feature levels for the binary classifier model.

FIG. 12 is a block diagram of a basic software system that may be employed for controlling the operation of a computer system.

DETAILED DESCRIPTION

Figure 1:
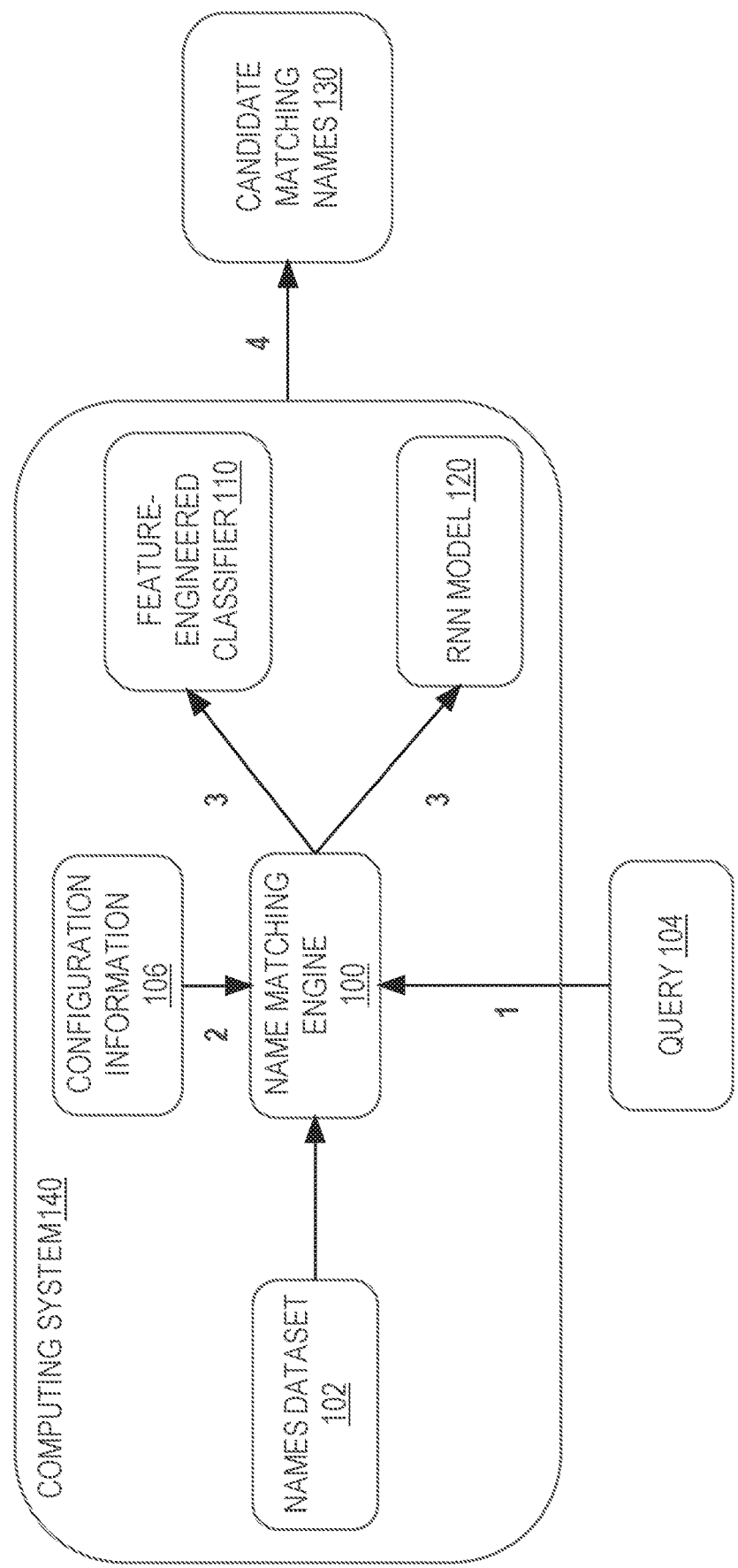
FIG. 1 depicts a name matching engine running on an example computing system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for a Name Matching Engine that is configured to return, for a queried name string, a list of possible matching name strings notwithstanding common differences in name strings representing matching names, such as transposed words, spelling errors, typos, and different character encodings. According to an embodiment, matching name strings represent one or more versions of the same or similar names, such as "John J. Smith" and "John Joseph Smith" or "Jamikka Millerton" and "Millerton, Jamikka". Name matching is described herein in the context of person-type entity names. However, other types of entities include name fields that may be compared according to techniques described herein, such as company-type entities, geography-type entities, etc. Thus, the descriptions of person-type entities herein are non-limiting examples to facilitate explanation of the described techniques.

According to an embodiment, to provide flexibility to accommodate the needs of a particular application, the Name Matching Engine integrates one or both of the following Machine Learning (ML) module options to implement a given name-matching task: a feature-engineered classifier option that enhances text-based comparison techniques with a feature-engineered binary classifier ML model, and an end-to-end Recurrent Neural Network (RNN) model option that directly accepts name strings as a sequence of n-grams and generates learned text embeddings. As a result of this enhanced automation, techniques described herein are able to greatly decrease manual investigation time for its users, which might otherwise be required to verify identified name matches.

The requirements and results of the two module options vary. For example, the modules differ with regard to computational resource requirements for training and inference phases of the respective ML models (e.g., CPUs vs. GPUs or cheap commodity hardware). Furthermore, application of the RNN model results in name string embeddings that may be employed for downstream tasks (e.g., outlier detection), whereas application of the feature-engineered classifier does not produce text embeddings but produces very accurate results.

The feature-engineered classifier works in two stages: a first stage of high-recall text-based candidate finding, and a second stage of high-precision processing with a statistically-trained binary classifier model. During the first stage, a text-based candidate finder identifies a candidate match list of strings that are textually similar to a search string. During the second stage, a binary classifier model predicts whether each string, of the candidate match list, is a match for the search string. The binary classifier model is feature-engineered to work over features from two or more of the following feature levels: a name feature level, a word feature level, a character feature level, and an initial feature level. The configuration of features over which the binary classifier model works facilitates production of high-precision predictions.

An application implementing the RNN model directly accepts n-grams of a name string as a sequence, and infers a vector representation (or word embedding) of the name string. A name is converted into a vector by the RNN model. For similar names RNN model produces similar vector representation. In order to produce vector representations of name strings that reflect the similarity of the names, the RNN model is trained to make the dot products of embeddings of matching name strings to be close to 0, and the dot products of embeddings of name strings that do not match to be close to 1. The RNN model can be extended to be used with other fields as well (e.g., physical addresses, email addresses, etc.) without a need for special feature-engineering effort.

According to an embodiment, when searching for similar names, a given name is converted with the RNN into a vector representation, and then an efficient Nearest Neighbor Search, with O(log N) time complexity, is performed over stored vector representations of a database of names to identify similar names.

Name Matching Engine

FIG. 1 depicts a Name Matching Engine 100 having access to a names dataset 102 and running on a computing system 140. In the example of FIG. 1, Name Matching Engine 100 supports both a feature-engineered classifier 110, and an end-to-end RNN model 120, to be selected depending on the requirements of a given application. According to an embodiment, computing system 140 comprises one or more computing devices as described in further detail below.

FIG. 1 further depicts an example workflow for Name Matching Engine 100. To illustrate, a user issues, to engine 100, a query 104 that requests one or more similar name strings, for an indicated query name, from names dataset 102. Based on configuration information 106, e.g., in a session associated with query 104, engine 100 automatically dispatches query 104 to one of the supported ML modules, e.g., either feature-engineered classifier 110 or RNN model 120. The selected ML module runs query 104 to produce a list of candidate matching names 130 presented in the names dataset 102. Candidate matching names list 130 is stored in machine-readable storage accessible by computing system 140. Candidate matching name strings list 130 is returned as a result of query 104.

Users interact with computing system 140 by submitting, to the system, commands that cause system 140 to perform operations, such as execution of queries. A user may be one or more applications running on a client computer that interact with computing system 140. Multiple users may also be referred to herein collectively as a user.

According to an embodiment, configuration information 106 includes user-specific information based on which engine 100 selects an ML module to run a given query. The strengths and weaknesses of feature-engineered classifier 110 and RNN model 120 vary, as follows. When engine 100 implements both modules, the aspects of each ML module inform balanced ML module selection.

Computation Power: Training RNN model 120, requires high-performance computing resources, such as a graphics processing unit (GPU). On the other hand, training a binary classifier model, such as is used by feature-engineered classifier 110, requires much less computation power than training an RNN model, for which a central processing unit (CPU) is generally sufficient.

Accuracy: RNN model 120 needs much more training data than feature-engineered classifier 110 to match its accuracy. As such, compiling the training data for RNN model 120 is more expensive than compiling the training data for feature-engineered classifier 110.

Name Embeddings: Unlike the binary classifier model, application of RNN model 120 provides text embeddings of the name strings being analyzed. Text embeddings may be used for other applications than name matching, such as outlier detection, which increases the potential utility of the results of the RNN model.

Golden Dataset

In order to train ML models for name string matching, a set of name strings that indicate both matching names with various differences and non-matching names, referred to herein as a "golden dataset", is used. FIG. 2 depicts an example golden dataset 200 with person-type name strings. Golden dataset 200 includes matching name pairs (i.e., pairs 202-206, 210-212, and 216-218), and also non-matching name pairs (i.e., pairs 208 and 214). The matching name pairs in golden dataset 200 represent various types of differences that commonly occur in different strings representing matching names, such as: inclusion of an initial to represent a word (as in pairs 202, 210, and 218); out of order words (as in pairs 202, 204, 210, 214, 216, and 218); hyphen-insertion (as in pairs 204 and 206); typos (as in pairs 204 and 206); dropped whitespace (as in pairs 210, 212, and 216); and word truncation (as in pair 212).

Feature-Engineered Classifier

FIG. 3 depicts the two stages of feature-engineered classifier 110. As depicted in FIG. 3, feature-engineered classifier 110 comprises a first stage of high-recall candidate finding by a candidate finder 310, and a second stage of high-precision processing with a statistically-trained binary classifier model 320.

During the first stage, candidate finder 310 identifies a list of strings that have textual similarities to a target query string based on a text-based comparison technique. However, such text-based comparison techniques generally exhibit deficiencies regarding ranking/scoring name matches, at least partially because of differences that commonly occur in different strings representing matching names. Thus, according to an embodiment, the text-based comparison technique employed by candidate finder 310 is used to identify a list of candidate matching name strings as a preliminary step in connection with the first stage of feature-engineered classifier 110.

During a second stage, feature-engineered binary classifier model 320 is used to predict whether the name strings in the list of candidate matching name strings, produced by candidate finder 310, are matches to the query name string. Utilization of binary classifier model 320 compensates for the inaccuracies of string similarity functions, thereby improving the precision of the overall name matching performed by feature-engineered classifier 110 when compared to a text-based comparison technique alone.

Candidate Finder

According to an embodiment, candidate finder 310 uses fuzzy text-search methods to scan through names dataset 102 and return a list of possible matches. Examples of systems that combine fuzzy text-search with storage for names dataset 102 include ElasticSearch, Lucene, Solr, etc. The fuzzy text-search technique employed should be fast (compared to the second phase of feature-engineered classifier 110) and return high quality candidates. Candidate finder 310 is configured to identify top-k name strings, e.g., from names dataset 102, that are textually similar to a target search string, e.g., identified by query 104. According to an embodiment, k is set to a high value (e.g., 50 or 100) to allow for identification of name strings, in the dataset, that match a target search string and yet have significant text-based differences from the target search string. For example, a relatively high k value ensures that variations of a target name string are included in the resulting candidate name list, even though the candidate names are dissimilar from a text perspective, e.g., a target name string represents a full name and a candidate-matching name string represents one of the name words as an initial.

According to an embodiment, candidate finder 310 performs pre-processing of name strings to normalize the strings and improve text-based similarity findings. For example, candidate finder 310 preprocesses a name string to replace punctuation with whitespace characters, and represents the name as a sequence of words delineated by whitespace. According to an embodiment, candidate finder 310 performs pre-processing on all names in dataset 102 and causes information for the names to be stored in an index data structure to speed up query execution. According to an embodiment, the text-based comparison technique implementing candidate finder 310 utilizes n-grams for text comparison. In this embodiment, to speed up future comparisons, candidate finder 310 converts the words of each name string in dataset 102 into n-gram tokens and stores the tokens in the index data structure.

FIG. 4 depicts a flowchart 400 for using a feature-engineered classifier to predict a match for a query name, according to an embodiment. In an example embodiment, a candidate finder is first used to identify a list of candidate matches for a query name. Each candidate returned by the candidate finder is compared to the query name with variety of comparison techniques. Each comparison technique produces a similarity metric, and the similarity metrices for a given candidate name and the target name are compiled to produce a vector of values. The vector of values is used as input to a binary classifier machine learning model. The classifier model is configured to decide whether the two strings, which are the basis of a given input metric vector, represent matching names.

Specifically, at step 402, a query to identify one or more matching name strings, from a set of name strings, that match a query name string is executed. For example, as depicted in FIG. 1, computing system 140 receives a query 104 from a user of the system. Based on configuration information 106, engine 100 identifies feature-engineered classifier 110 to execute query 104, and, based on identifying classifier 110, causes feature-engineered classifier 110 to execute query 104 against names dataset 102.

According to an embodiment, executing the query comprises, for each target name string of a set of target name strings from the set of name strings, performing steps 404 and 406 of flowchart 400. For example, query 104 indicates a query name 302 (FIG. 3), "Carl James Newman". Query name 104 is passed to candidate finder 310, which identifies, from dataset 102 (FIG. 1), a list of candidate name matches 304 for query name 302. More specifically, candidate finder 310 employs a text-based comparison technique to return a list 304 of top-k textual matches within names dataset 102. The top-k results from the search performed by candidate finder 310 have the top similarity scores, with respect to query name 302, among the name strings in dataset 102.

In this example, steps 404 and 406 are performed for each name string in list 304 produced by candidate finder 310. Applying binary classifier model 320 to the name strings from list 304 (instead of applying the model to all name strings in dataset 102), as described in further detail below, reduces evaluation time of binary classifier model 320 by eliminating obvious non-matches from evaluation. However, according to one or more embodiments, the target name strings from the dataset of name strings may be identified in any way. According to an embodiment, candidate finder 310 is omitted and binary classifier model 320 is applied to the entire dataset 102, or to a subset of dataset 102 determined in another way, to identify matching name strings therein.

Feature-Engineered Binary Classifier Model

At step 404 of flowchart 400, a set of features, from a plurality of feature levels, is identified for a pair of name strings that comprises the query name string and said each target name string, where the plurality of feature levels comprises two or more of: a name feature level, a word feature level, a character feature level, and an initial feature level. For example, computing system 140 generates pairs of name strings, where each pair includes query name 302 and a respective name string from list 304. For each pair of name strings, multiple similarity metrics are calculated that compare query string 320 to a respective candidate name identified by candidate finder 310. Different similarity metrics compare a pair of strings from different points of view represented by the feature levels. Specifically, for each name string pair, system 140 identifies a set of features from two or more feature levels.

FIG. 5 depicts a table 500 with information about various feature levels including a name feature level 510, a word feature level 520, a character feature level 530, and an initial feature level 540. Table 500 further includes examples illustrating the features levels, and examples of similarity functions. As indicated, for each level, one or more string similarity functions are employed, such as Jaro-Winkler, Damerau Levenshtein distance, Longest Common Subsequence, Sorensen-Dice similarity, Normalized compression distance (NCD), etc. In table 500, name feature level 510 uses Sorensen-Dice similarity and NCD metrics to measure differences in whole, full names. Word feature level 520 uses Jaro-Winkler, Damerau Levenshtein distance, Longest Common Subsequence metrics to measure differences in words of the two names. Character feature level 530 and initial feature level 540 both use Sorensen-Dice metric, and, in addition, initial level 540 uses Longest Common Subsequence metric to measure differences between characters of the two names, and to account for initials in the two names, respectively.

Returning to a discussion of step 404, for a given pair of name strings, system 140 determines one or more similarity scores for each of two or more feature levels. Table 500 includes information for an example pair comparison 550 between query name 302 (i.e., "Carl James Newman") and a name from list 304 (i.e., "James R Newman"). In example pair comparison 550, system 140 generates similarity scores for each of levels 510-540 for the indicated pair of name strings.

For name level 510, using each of one or more string similarity functions, system 140 compares the entirety of the name strings to identify one or more name-level similarity scores for a given pair of name strings. According to the example set of features of FIG. 5, both Sorensen-Dice similarity and NCD are used to generate two name-level similarity scores for a given pair of name strings. The name-level scores provide information regarding the overall similarity between the name strings.

For word level 520, using each of one or more string similarity functions, system 140 compares each word in the query name string to each word in the target name string from list 304, which operation is referred to herein as a "cross-product" name string comparison. The cross-product comparison results in a plurality of word-based similarity scores. System 140 identifies the top n number of similarity scores, where n is the number of words in the query name string, and produces an overall score based on the top n scores (e.g., by concatenating the top n scores, averaging the scores, etc.). According to the example set of features of FIG. 5, an overall word-level score for a given pair of name strings is generated using each of Damerau Levenshtein distance, Jaro-Winkler, and Longest Common Subsequence. These word-level scores allow binary classifier model 320 to perform an order-agnostic evaluation of the similarity of two name strings, which facilitates identifying matches when name strings include the same or similar words that are transposed with respect to each other (such as "Carl James Newman" and "Newman, Carl James").

For character level 530, system 140 compares the characters in the two name strings of a given pair such that all whitespace or punctuation (if any) are removed from consideration. For example, Sorensen-Dice string similarity is used to calculate the character-level score for the example pair comparison 550 in table 500. This similarity function compares n-grams of the two name strings (with punctuation and whitespace removed) to identify subsets of characters that match among the strings. Any string similarity function that allows analysis at the character level without relying on overall ordering of the characters could be used for character level 530. This word-agnostic comparison provides a character-level score indicating the similarity of groupings of characters within the name strings. Thus, if there is a typo in one of the name strings (such as in the pair "Carl James Newman" and "Carl James Newman"), the similarities of all other characters in the two strings remain very high where a word-based analysis of the strings may not be as high.

For initial level 540, system 140 compares the first letters of the words of a given pair of name strings. According to an embodiment, a string similarity function for initial level 540 allows for the initials to be in different orders among the pair of name strings. According to another embodiment, word-level (520) similarity function output is used to order the first letters of the words for initial-level comparison such that the initials of the most similar words among the pair of strings are compared with each other. The resulting initial-level similarity score gives insight into the similarity of name strings where one or more of the words in the name strings are represented as initials.

According to an embodiment, the similarity scores generated for a given pair of names are compiled (e.g., concatenated) to generate a feature vector, which is input to binary classifier model 320. The following is an example feature vector pattern, where the format of the components of the pattern is {Level}-{Function}[-{n-gram}]; an n-gram can be thought of as the smallest comparison unit for the computation of similarity scores, and is represented in the pattern where applicable:

NAME_LEVEL_SIMILARITY-NCD, NAME_LEVEL_SIMILARITY-DICE-2, NAME_LEVEL_SIMILAR-

ITY-DICE-3, WORD_LEVEL_SIMILARITY-DL-1, WORD_LEVEL_SIMILARITY-JARO_WINKLER-1, WORD_LEVEL_SIMILARITY-LONGEST_COMMON_SUBSEQUENCE-1, CHARACTER_LEVEL_SIMILARITY-DICE-1, CHARACTER_LEVEL_SIMILARITY-DICE-2, INITIAL LEVEL_SIMILARITY-DICE-1

Each component of the feature vector pattern corresponds to a similarity score depicted in table 500. A feature vector that is based on the pattern, and input to binary classifier model 320, comprises a sequence of similarity scores as indicated by the sequence components of the pattern. To illustrate, FIG. 6 depicts a table 600 of example similarity scores calculated for a particular pair of names. An example feature vector based on the above pattern with the example similarity of table 600 is as follows: [0.80, 0.75, 0.60, 0.90, 0.80, 0.85, 1.00, 0.80, 1.00].

The levels that are utilized in a given application of techniques described herein depend on the problems that need to be solved in the dataset being analyzed. For example, if it is known that the dataset does not allow names to be represented as initials, initial level 540 may be omitted from the feature vector. Furthermore, additional levels may be utilized according to embodiments, such as a level that deals with differing character encodings or a level that deals with special characters, depending on the needs of the application.

At step 406, a machine-learning model is applied against the set of features for the pair of name strings to generate output that comprises a matching prediction for the pair of name strings. For example, the feature vector produced for each pair of name strings (as described above) is provided as input to a trained binary classifier model 320.

According to an embodiment, binary classifier model 320 is trained, based on feature vectors (such as feature vectors according to the pattern indicated above) generated for pairs of names from a golden dataset described above, to identify matching names notwithstanding differences that commonly occur in different strings representing matching names. Specifically, according to an embodiment, binary classifier model 320 is trained based on the data retrieved from the candidate finder 310 query results. Assuming that golden dataset 200, including matching pairs of name strings, is provided, each name in golden dataset 200 is queried, with high top-k value, against the candidate finder 310 server to identify a set of names that include both true positive matches and false positive matches of each name in the golden dataset. According to an embodiment, after collecting such a dataset with true/false positives, binary classifier model 320 is built using a Booster classifier, such as the CatBoost, that uses gradient boosting on decision trees.

When a given feature vector is provided, as input, to binary classifier model 320, binary classifier model 320 is applied against the feature vector by system 140 using model 320 to perform inference over the input to produce a predicted result, i.e., match result 322 or not match result 324.

Returning to the discussion of flowchart 400, at step 408, results from said executing the query are returned. For example, based on the match/not match predictions resulting from applying binary classifier model 320 to feature vectors generated for the pairs of name strings described in the example above, computing system 140 returns, as a result of query 104, a list of matching name strings that are predicted to be matches for the query name.

End-to-End Recurrent Neural Network (RNN) Model

According to an embodiment, RNN model 120 is an alternative to feature-based model 110 in engine 100. RNN model 120 directly learns vector representations of name strings. The similarity of names may be determined based on the learned vector representations of the name strings. RNN model 120 does not require any traditional string similarity algorithm or any scanning algorithm as a first phase. In fact, an application implementing RNN model 120 directly accepts n-grams of a name string as a sequence, and infers a vector representation of the name string such that similar (matching) name strings are close to each other in the feature space of the model.

Not only does this model allow for unsupervised name matching, the model enables powerful embedding-based functions that may be performed over text embeddings generated based on RNN model 120. More specifically, the distribution of text embeddings, resulting from application of RNN model 120, in the feature space may be useful for many use cases. To illustrate, given that names and addresses may be represented in the same feature space, one can use the embeddings for outlier detection. For example, the Isolation Forest method can identify anomalous cases such that over a threshold number of people are determined to be placed very close to the same address which could imply a shell company address.

Like binary classifier model 320, RNN model 120 is automatically trained on a labeled dataset, such as golden dataset 200. According to an embodiment, training RNN model 120 is performed automatically as follows:

For each training iteration, the vector representation of each name in golden dataset 200 is computed using the currently-trained model.

The k-Nearest-Neighbors of each vector is computed, and it is checked whether neighboring vectors (representing other name strings) are labeled as a match.

According to an embodiment, the model is trained with pairs that are incorrectly classified (e.g., false positives and false negatives) in a subsequent training iteration, such that alternating iterations of training phases train the model on false pairings, and on true pairings from golden dataset 200, respectively.

The data is iteratively processed in this fashion until RNN model 120 converges, i.e., backpropagation is used to retrain the weights of the all layers in the RNN model 120 architecture (as described in further detail below) based on the loss function determined from the outcome of the model at each iteration when compared with the training data being used to produce the outcome.

RNN Model Architecture

The architecture of RNN model 120 includes the following layers:

an input layer that accepts the name string, an n-gram embeddings layer that creates embeddings for n-grams of the name string, a bidirectional gated recurrent unit (GRU) layer that processes the n-gram embeddings of each word, in sequence, to produce a vector representation of the word, a concatenate layer that concatenates the vector representations of each word of name string, and a dense layer that produces a final vector representation of each name string from the output of the concatenate layer.

As an end-to-end RNN, RNN model 120 learns any weights, via backpropagation during the training phase, required to produce representations of the strings at these layers. According to an embodiment, backpropagation is used to learn weights for the n-gram embeddings layer, the bidirectional GRU layer, and the dense layer of RNN model 120. The objective is to tune the weights so that the dot product of vector representations (predicted by the dense layer) of matching strings is close to 1 and the dot product of vector representations of non-matching strings is close to 0. Specifically, the difference between the cosine similarity score of a given pair of name strings and the expected similarity score of the name strings (as recorded in the training data) is measured by a loss function, and the resulting error is backpropagated through RNN model 120 to train the model.

Figure 7:
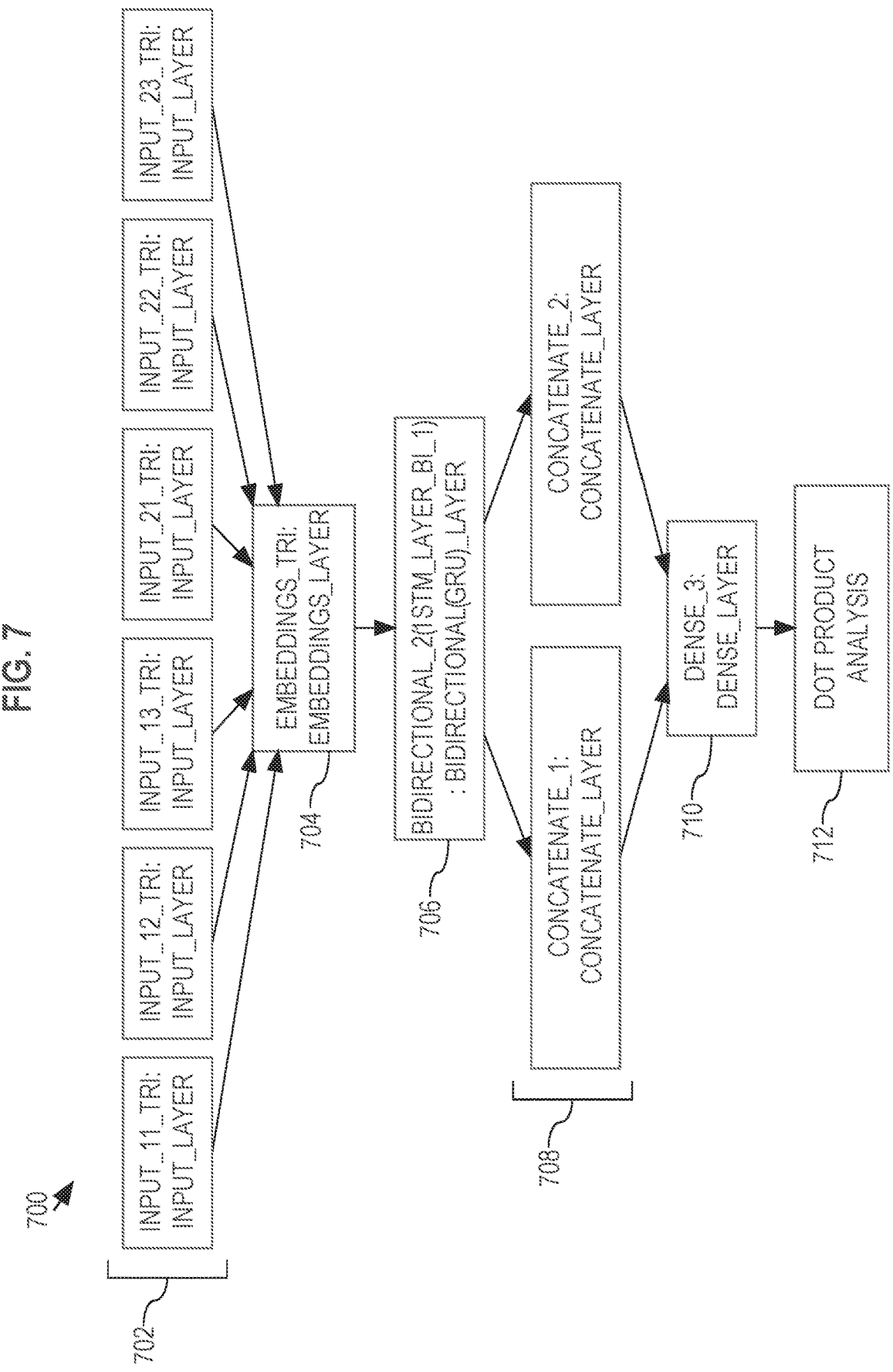
FIG. 7 depicts an example end-to-end RNN model architecture.

FIG. 7 depicts an example RNN model pipeline 700, which illustrates steps 702-712 of applying the layers of RNN model 120 to compare two name strings. Notwithstanding the application of RNN model 120 to two name strings in pipeline 700, RNN model 120 may be applied to a single name string to produce a text embedding to represent the single name string. The resulting text embedding may be used to identify one or more matching strings for which text embeddings have already been produced, or may be used for other downstream applications, such as outlier detection.

In example pipeline 700, each name string comprises three words: a first name, a middle name, and a last name. Thus, the layers of RNN model 120 in example pipeline 700 are configured for person-type names as an illustrative example. Furthermore, in example pipeline 700, tri-grams are used to analyze name strings. However, RNN model 120 may be configured in any way, including using any number of words for the input strings, any type of strings (e.g., person-type name, company-type name, address, etc.), and any cardinality of n-grams for analysis.

Returning to the discussion of example pipeline 700, as shown at step 702, the input layer of RNN model 120 accepts three words for each name string (input_ij). The input words are represented as sequences of n-grams (in this example, tri-grams). If a given name string does not include the expected three words, the n-gram representations of any missing words are padded, e.g., with zeroes. For example, a name string "John Richard Smith" is broken up into the following tri-grams at the input layer of RNN model 120: "JOH, OHN"; "RIC, ICH, CHA, HAR, ARD"; and "SMI, MIT, ITH". As a further example, a name string "John Smith", which is missing a middle name, is broken up into the following tri-grams at the input layer of RNN model 120: "JOH, OHN"; "000"; and "SMI, MIT, ITH".

Figure 8:
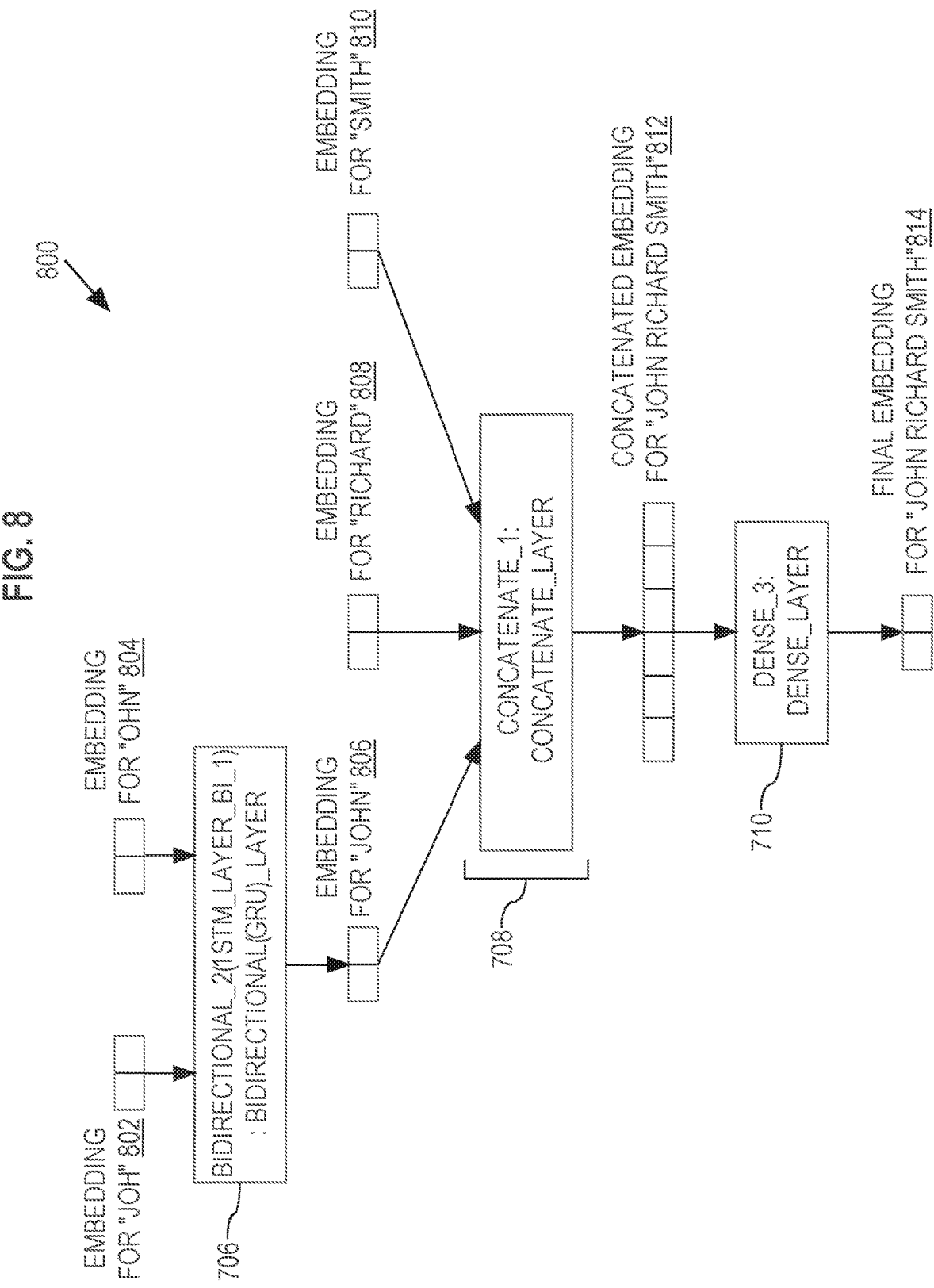
FIG. 8 depicts a more detailed example of application of an RNN model.

Embeddings (or vector representations) for the n-grams of the words resulting from the input layer of RNN model 120 are generated at the n-gram embeddings layer of RNN model 120. FIG. 8 depicts a more detailed example 800 of application of RNN model 120 for the name string "John Richard Smith". In example 800, the vector representations are two-dimensional; however, the vector representations emitted based on application of RNN model 120 may have any number of dimensions, e.g., 100 dimensions. Example 800 explicitly depicts an embedding 802 for "JOH" and an embedding 804 for "OHN", generated by the n-gram embeddings layer of RNN model 120, which are input to the bidirectional GRU layer of RNN model 120.

At step 706 of pipeline 700, the GRU of the bidirectional GRU layer of RNN model 120 processes the n-gram embeddings of each word of a given name string, in sequence, to produce a vector representation of each word. To illustrate, example 800 depicts applying the bidirectional GRU layer of RNN model 120 to embeddings 802 and 804 (at step 706 of pipeline 700) to produce an embedding 806 for the word "JOHN". Similarly, embeddings 808 and 810 for the other two words of the name string, "RICHARD" and "SMITH", are produced at step 706 based on the respective embeddings of the n-grams of those words. As indicated above, the word embeddings 806, 808, and 810 are represented as two-dimensional vectors in this example.

At step 708 of pipeline 700, the vector representations of the words of the two name strings are concatenated at the concatenate layer of RNN model 120 to produce a concatenated vector representation for each name string. To illustrate, example 800 depicts the two-dimensional embeddings 806, 808, and 810 for the words of "John Richard Smith" being concatenated by the concatenate layer of RNN model 120 to produce a six-dimensional concatenated embedding 812 for the name string.

At step 710 of pipeline 700, the concatenated vector representations of the two name strings are processed at the dense layer of RNN model 120 to produce a final vector representation of each name string. According to an embodiment, the dense layer of RNN model 120 is a fully-connected layer such that all dimensions of the concatenated vector representation of the name string are processed to determine each dimension of the final vector representation of the name string. To illustrate in the context of example 800, the six dimensions of concatenated embedding 812 are used to produce each of the two dimensions of the final embedding 814 for the name string "John Richard Smith".

Figure 9:
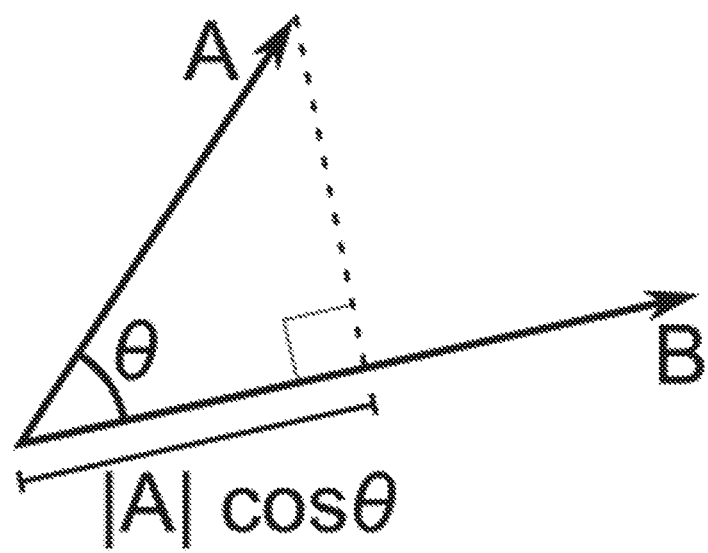
FIG. 9 depicts the dot product between vectors A and B.

At step 712 of pipeline 700, a dot product of the final vector representations of the two name strings is generated, which indicates whether the name strings are a match. According to an embodiment, a cosine similarity score (resulting from the dot product operation) that is over a threshold number, e.g., 0.9, indicates a match. FIG. 9 depicts a dot product operation between vectors A and B. The result of a dot product is scalar, and measures vector similarity. In effect, a dot product is equivalent to projecting one vector (A) on the other vector (B), taking the signed distance of the resulting projection multiplied by the length of B. If the angle between vector A and vector B is less than 90°, the result of the dot product is positive; if the angle is 90°, then the dot product is 0; and if the angle is greater than 90°, the dot product is negative. When very similar (or the same) vectors are compared via dot product, the result of the dot product is very close to (or is) 1.

During a training phase of RNN model 120, the model is trained to have close vector representations of potentially matching name strings. The objective is to predict text embeddings of name strings such that the cosine similarity score for embeddings of matching name strings is close to 1. Because vector representations of strings, as predicted by application of RNN model 120, may be directly compared by dot product operations to determine the similarity of the strings, performance of nearest-neighbors search with an O(log N) time requirement can be used with the vector representations of strings to determine closest-placed name strings to a query name string in the vector space.

Identifying Matching Names Using the Trained RNN Model

Figure 10:
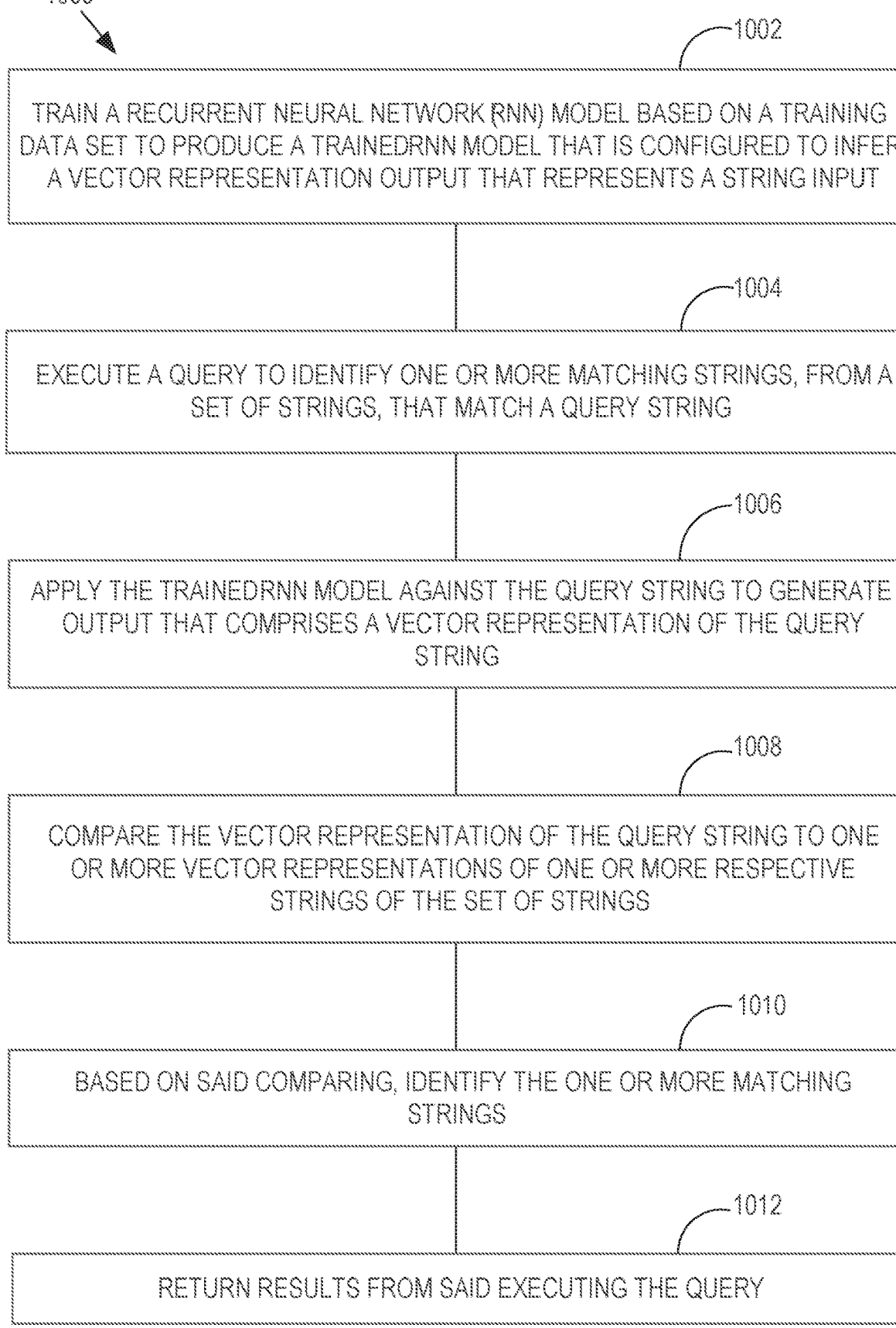
FIG. 10 depicts a flowchart for training and applying an RNN model to identify matching strings.

FIG. 10 depicts a flowchart 1000 for training and applying an RNN model to identify matching strings, according to an embodiment. Specifically, at step 1002, an RNN model is trained, based on a training data set, to produce a trained RNN model that is configured to infer a vector representation output that represents a string input. For example, as described in detail above, RNN model 120 is trained by a computing device, based on information in golden dataset 200, to infer vector representations of name strings such that similar (matching) name strings are close to each other in the feature space of the model.

At step 1004, a query to identify one or more matching strings, from a set of strings, that match a query string is executed. For example, as depicted in FIG. 1, computing system 140 receives a query 104 from a user of the system, i.e., at name matching engine 100. Based on configuration information 106 associated with the user, engine 100 selects RNN model 120 to execute query 104. In this example, query 104 is a request to determine the name strings, in dataset 102, that match "John Smith". According to an embodiment, executing the query comprises performing steps 1006, 1008, and 1010 of flowchart 1000.

At step 1006, the trained RNN model is applied against the query string to generate output that comprises a vector representation of the query string. For example, in a manner similar to example 800 of FIG. 8, computing system 140 generates a text embedding that represents the string "John Smith" based on the trained RNN model 120. In other words, computing system 140 applies RNN model 120 against a set of features (i.e., n-grams generated at the input layer of RNN model 120) of the input name string using RNN model 120 to perform inference over the input to produce a predicted result, i.e., the final text embedding representing the name string.

At step 1008, the vector representation of the query string is compared to one or more vector representations of one or more respective strings of the set of strings. For example, text embeddings for the strings in dataset 102 are produced based on trained RNN model 120. Computing system 140 compares the final text embedding generated for the query string "John Smith" to text embeddings that have been determined for the strings in dataset 102, as required by the query. According to an embodiment, computing system 140 identifies one or more matching name strings from dataset 102 by performing a Nearest Neighbor Search using cosine similarity score. The k name strings represented by k closest vectors to the query representation are returned. Alternatively, computer system 140 returns all name strings whose vector representation is closer than a threshold specified in configuration information 106.

According to an embodiment, to perform a given comparison, computing system 140 produces dot products of the vector representation of the query string and vector representations of strings in dataset 102. Computing system 140 identifies matching name strings as those strings in dataset 102 whose embeddings, when compared with the embedding of the query string, have a cosine similarity score that is higher than a threshold value, such as 0.9.

At step 1010, the one or more matching strings are identified based on said comparing the vector representation of the query string to the one or more vector representations of one or more respective strings of the set of strings. For example, computing system 140 identifies two name strings (e.g., "John J. Smith", and "John Richard Smith") from dataset 102 that, when their text embeddings are compared to the text embedding of the query string "John Smith", are associated with a cosine similarity value that is above the threshold value.

At step 1012, results from said executing the query are returned. For example, computing system 140 returns, to the user that submitted the query, the two name strings identified as closest to the query string in the vector space.

Machine Learning

Machine learning can encode, within trained models, classification algorithms to classify sequential data (such as: natural language sentences; a series of events resulting from user interaction with a website; network streams; etc.). Classification algorithms classify portions of sequential data with labels, and accurate classification algorithms can be used to glean information from sequential data without intervention of a human. For example, a machine learning algorithm uses a small amount of labeled data to learn an algorithm that classifies English sentences as having positive, negative, or neutral sentiments. As further examples, such a machine learning algorithm can learn whether the behavior, of a consumer represented as a time-series of an online profile, has changed; or to detect attackers in network traffic; or even to automatically find semantic mistakes in computer programs.

Machine Learning Model

A machine learning model is trained using a particular machine learning algorithm. Once trained, input is applied to the machine learning model to make a prediction, which may also be referred to herein as a predicated output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output, as described above. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e., configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, Matlab, R, and Python.

Artificial Neural Networks

An artificial neural network (ANN) is a machine learning model that at a high level models a system of neurons interconnected by directed edges. An overview of neural networks is described within the context of a layered feed-forward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input node, the activation value is simply an input value for the input. For an activation neuron, the activation value is the output of the respective activation function of the activation neuron.

Each edge from a particular node to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation node, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of nodes in layer L−1 and L is N[L−1] and N[L], respectively, the dimensions of matrix W are N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input node. The particular input may be stored as vector. Training data comprises multiple inputs, each being referred to as sample in a set of samples. Each sample includes a value for each input node. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every node in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of nodes and/or edges determines the size of matrices needed to implement a neural network. The smaller the number of nodes and edges in a neural network, the smaller matrices and amount of memory needed to store matrices. In addition, a smaller number of nodes and edges reduces the amount of computation needed to apply or train a neural network. Less nodes means less activation values need be computed, and/or less derivative values need be computed during training.

Properties of matrices used to implement a neural network correspond neurons and edges. A cell in a matrix W represents a particular edge from a node in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e., number of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e., ceases to reduce) or vanishes beneath a threshold (i.e., approaches zero). Example mathematical formulae and techniques for feedforward multilayer perceptron (MLP), including matrix operations and backpropagation, are taught in a related reference "Exact Calculation Of The Hessian Matrix For The Multi-Layer Perceptron," by Christopher M. Bishop, the entire contents of which are hereby incorporated by reference as if fully set forth herein.

Model training may be supervised or unsupervised. For supervised training, the desired (i.e., correct) output is already known for each example in a training set. The training set is configured in advance by (e.g., a human expert, or via the labeling algorithm described above) assigning a categorization label to each example. For example, the training set for binary classifier model 320 (e.g., golden dataset 200) is labeled. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-ENCODER ENHANCED SELF-DIAGNOSTIC COMPONENTS FOR MODEL MONITORING". That patent application elevates a supervised or unsupervised ANN model as a first class object that is amenable to management techniques such as monitoring and governance during model development such as during training.

Deep Context Overview

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e., complexity) of a momentary input may be less than the information content of the surrounding context. Thus, semantics may occur based on context, such as a temporal sequence across inputs or an extended pattern (e.g., compound geometry) within an input example. Various techniques have emerged that make deep learning be contextual. One general strategy is contextual encoding, which packs a stimulus input and its context (i.e., surrounding/related details) into a same (e.g., densely) encoded unit that may be applied to an ANN for analysis. One form of contextual encoding is graph embedding, which constructs and prunes (i.e., limits the extent of) a logical graph of (e.g., temporally or semantically) related events or records. The graph embedding may be used as a contextual encoding and input stimulus to an ANN.

Hidden state (i.e., memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection, as described in detail above.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e., reset) gate. Unlike a binary circuit, the input and output gates may conduct an (e.g., unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e., gross topology). Each step receives two inputs and outputs two outputs. One input is external activation from an item in an input sequence. The other input is an output of the adjacent previous step that may embed details from some or all previous steps, which achieves sequential history (i.e., temporal context). The other output is a predicted next item in the sequence. Example mathematical formulae and techniques for RNNs and LSTM are taught in related U.S. patent application Ser. No. 15/347,501, entitled "MEMORY CELL UNIT AND RECURRENT NEURAL NETWORK INCLUDING MULTIPLE MEMORY CELL UNITS."

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation. Example mathematical formulae, pseudocode, and techniques for training RNN models using backpropagation through time are taught in related W.I.P.O. patent application No. PCT/US2017/033698, entitled "MEMORY-EFFICIENT BACK-PROPAGATION THROUGH TIME".

Random Forest

Random forests or random decision forests are an ensemble of learning approaches that construct a collection of randomly generated nodes and decision trees during the training phase. The different decision trees are constructed to be each randomly restricted to only particular subsets of feature dimensions of the data set. Therefore, the decision trees gain accuracy as the decision trees grow without being forced to over fit the training data as would happen if the decision trees were forced to be restricted to all the feature dimensions of the data set. Predictions for the time-series are calculated based on the mean of the predictions from the different decision trees.

The following is an example and non-limiting method of training a set of Random Forest models for making estimations of network I/O utilization for an example model type, i.e., a ToR switch ML model, according to an embodiment. A best trained Random Forest ToR switch ML model is selected, from a set of models resulting from the training phase, to be the basis for instances of a trained ToR switch ML model deployed to respective ToR switches, e.g., in a datacenter. An ML service running on a computing device produces a training data set for ToR switch ML models. In some embodiments, the ML service preprocesses the historical utilization data gathered from the non-OS sources prior to labeling the training data that will be used to train the Random Forest ToR switch ML model. The preprocessing may include cleaning the readings for null values, normalizing the data, downsampling the features, etc.

In an embodiment, the ML service receives hyper-parameter specifications for the Random Forest ToR switch ML model to be trained. Without limitation, these hyper-parameters may include values of model parameters such as number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

The Random Forest ToR switch ML model is trained using the specified hyper-parameters and the training data set (or the preprocessed sequence training data, if applicable). The trained model is evaluated using the test and validation data sets, as described above.

According to embodiments, a determination is made of whether to generate another set of hyper-parameter specifications. If so, another set of hyper-parameter specifications is generated and another Random Forest ToR switch ML model is trained having the new set of hypermeters specified. All Random Forest ToR switch ML models trained during this training phase are the set of models from which the best trained ToR switch ML model is chosen.

Computing System Information

A process or application comprises a combination of the software and allocation of resources from a machine node. Specifically, a process or application is a combination of integrated software components and an allocation of computational resources, such as memory, a machine node (i.e., a computing device and/or memory accessible to the computing device), and/or sub-processes on the machine node for executing the integrated software components on a processor, the combination of the software and computational resources being dedicated to performing a particular function, e.g., on behalf of one or more clients.

One or more of the functions attributed to any process described herein, may be performed by any other logical entity that may or may not be depicted in FIG. 1, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
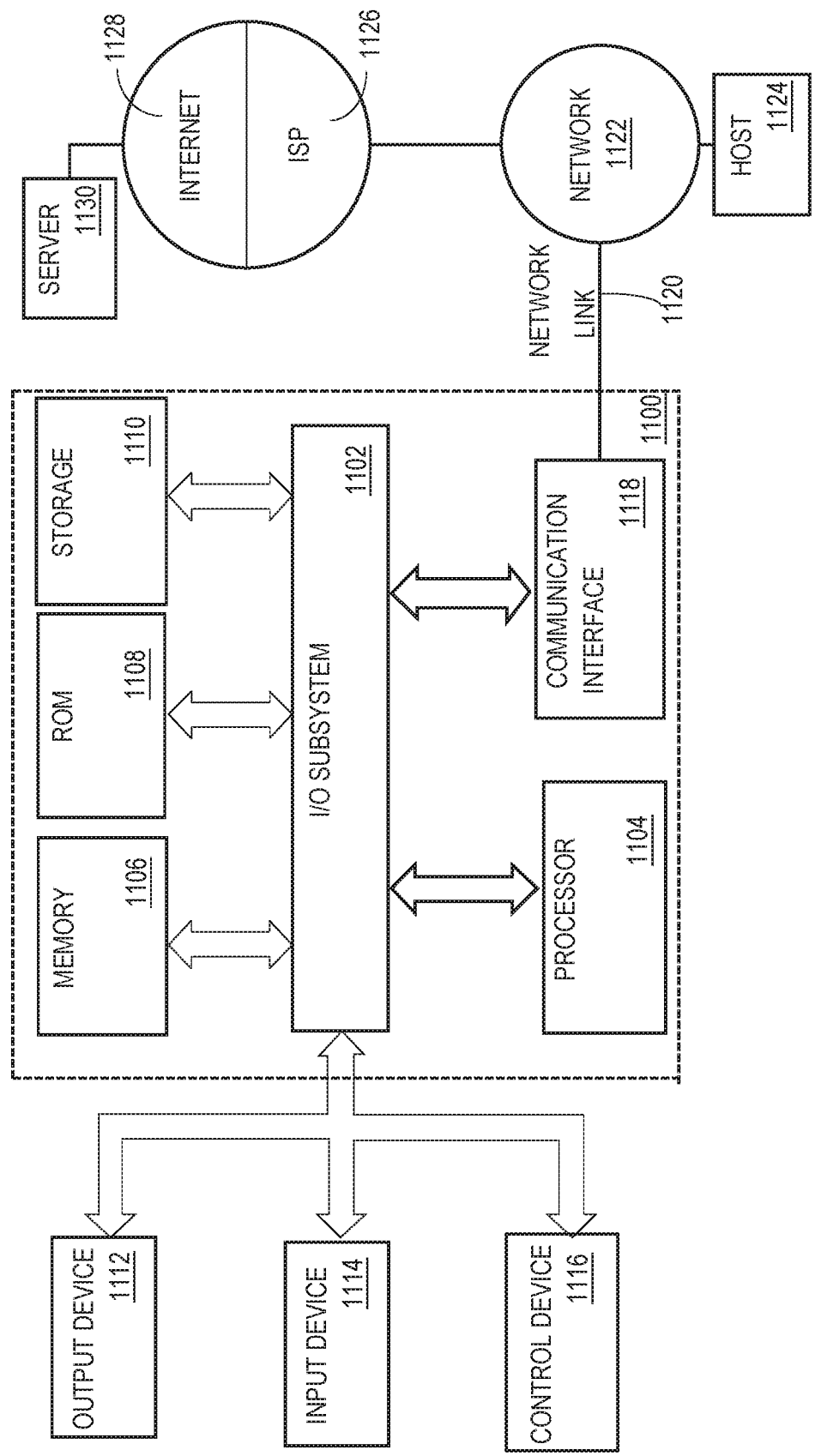
FIG. 11 is a block diagram that illustrates a computer system upon which an embodiment may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic, or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the worldwide packet data communication network now commonly referred to as the "Internet" 1128. Local network 1122 and Internet 1128 both use electrical, electromagnetic, or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

Software Overview

FIG. 12 is a block diagram of a basic software system 1200 that may be employed for controlling the operation of computer system 1100. Software system 1200 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1200 is provided for directing the operation of computer system 1100. Software system 1200, which may be stored in system memory (RAM) 1106 and on fixed storage (e.g., hard disk or flash memory) 1110, includes a kernel or operating system (OS) 1210.

The OS 1210 manages low-level aspects of computer operation, including managing execution of processes, memory allocation, file input and output (I/O), and device I/O. One or more application programs, represented as 1202A, 1202B, 1202C . . . 1202N, may be "loaded" (e.g., transferred from fixed storage 1110 into memory 1106) for execution by the system 1200. The applications or other software intended for use on computer system 1100 may also be stored as a set of downloadable computer-executable instructions, for example, for downloading and installation from an Internet location (e.g., a Web server, an app store, or other online service).

Software system 1200 includes a graphical user interface (GUI) 1215, for receiving user commands and data in a graphical (e.g., "point-and-click" or "touch gesture") fashion. These inputs, in turn, may be acted upon by the system 1200 in accordance with instructions from operating system 1210 and/or application(s) 1202. The GUI 1215 also serves to display the results of operation from the OS 1210 and application(s) 1202, whereupon the user may supply additional inputs or terminate the session (e.g., log off).

OS 1210 can execute directly on the bare hardware 1220 (e.g., processor(s) 1104) of computer system 1100. Alternatively, a hypervisor or virtual machine monitor (VMM) 1230 may be interposed between the bare hardware 1220 and the OS 1210. In this configuration, VMM 1230 acts as a software "cushion" or virtualization layer between the OS 1210 and the bare hardware 1220 of the computer system 1100.

VMM 1230 instantiates and runs one or more virtual machine instances ("guest machines"). Each guest machine comprises a "guest" operating system, such as OS 1210, and one or more applications, such as application(s) 1202, designed to execute on the guest operating system. The VMM 1230 presents the guest operating systems with a virtual operating platform and manages the execution of the guest operating systems.

In some instances, the VMM 1230 may allow a guest operating system to run as if it is running on the bare hardware 1220 of computer system 1100 directly. In these instances, the same version of the guest operating system configured to execute on the bare hardware 1220 directly may also execute on VMM 1230 without modification or reconfiguration. In other words, VMM 1230 may provide full hardware and CPU virtualization to a guest operating system in some instances.

In other instances, a guest operating system may be specially designed or configured to execute on VMM 1230 for efficiency. In these instances, the guest operating system is "aware" that it executes on a virtual machine monitor. In other words, VMM 1230 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
executing a query to identify one or more matching name strings that match a query name string;
wherein executing the query comprises:
identifying a set of target name strings, from a set of name strings, that are textually similar to the query name string; and
for each given target name string of the set of target name strings:
identifying a set of two or more features, from a plurality of feature levels, for a pair of name strings that comprises the query name string and the given target name string;
wherein the plurality of feature levels comprises two or more of:
a name feature level for comparing the entirety of the query name string to the entirety of the given target name string,
a word feature level for comparing each word in the query name string to each word in the given target name string,
a character feature level for comparing the characters in the query name string to the characters in the given target name string, or
an initial feature level for comparing first letters of the words in the query name string to the first letters of the words in the given target name string;
wherein each feature in the set of two or more features comprises a similarity score corresponding to a respective feature level from the plurality of feature levels;
applying a machine-learning model against the set of two or more features for the pair of name strings to generate output that comprises a matching prediction for the pair of name strings;

returning results from said executing the query; wherein the method is performed by one or more computing devices.

2. The computer-executed method of claim 1, wherein identifying the set of target name strings comprises:
for each name string of the set of name strings, determining a text-based matching score that indicates a degree of textual matching between said each name string and the query name string;
wherein each target name string, of the set of target name strings, is associated with a text-based matching score that is among a threshold number of highest text-based matching scores for name strings of the set of name strings.

3. The computer-executed method of claim 1, wherein:
each feature level within the plurality of feature levels has a corresponding set of similarity functions,
the set of features includes a plurality of features for a particular feature level of the plurality of feature levels,
a first feature within the plurality of features for the particular feature level corresponds to a first similarity function within the set of similarity functions, and
a second feature within the plurality of features for the particular feature level corresponds to a second similarity function within the set of similarity functions.

4. The computer-executed method of claim 1, wherein:
the plurality of feature levels comprises the name feature level; and
identifying a particular set of features, from the plurality of feature levels, for a particular pair of name strings that comprises the query name string and a particular target name string, of the set of target name strings, comprises:
generating at least one similarity score based on at least one comparison of the whole query name string and the whole particular target name string, and
including the at least one similarity score in the particular set of features.

5. The computer-executed method of claim 1, wherein:
the plurality of feature levels comprises the word feature level; and
identifying a particular set of features, from the plurality of feature levels, for a particular pair of name strings that comprises the query name string and a particular target name string, of the set of target name strings, comprises:
generating a plurality of similarity scores based on a plurality of comparisons between words of the query name string and words of the particular target name string,
identifying a set of highest similarity scores of the plurality of similarity scores; and
including the set of highest similarity scores in the particular set of features.

6. The computer-executed method of claim 1, wherein:
the plurality of feature levels comprises the character feature level; and
identifying a particular set of features, from the plurality of feature levels, for a particular pair of name strings that comprises the query name string and a particular target name string, of the set of target name strings, comprises:
generating at least one similarity score based on at least one comparison of a first set of characters in the query name string and a second set of characters in the particular target name string, and including the at least one similarity score in the particular set of features.

7. The computer-executed method of claim 1, wherein:
the plurality of feature levels comprises the initial feature level; and
identifying a particular set of features, from the plurality of feature levels, for a particular pair of name strings that comprises the query name string and a particular target name string, of the set of target name strings, comprises:
generating at least one similarity score based on at least one comparison of a first set of first letters of words in the query name string and a second set of first letters of words in the particular target name string, and
including the at least one similarity score in the particular set of features.

8. The computer-executed method of claim 1, wherein identifying a particular set of features, from the plurality of feature levels, for a particular pair of name strings that comprises the query name string and a particular target name string, of the set of target name strings comprises: using one or more text similarity functions of a group of text similarity functions that includes: Sorensen-Dice similarity, Normalized compression distance (NCD), Damerau Levenshtein distance, Jaro-Winkler, or Longest Common Subsequence.

9. The method of claim 1, wherein identifying the set of target name strings comprises using fuzzy text-search to scan through the set of name strings and return the set of target name strings that are textually similar to the query name string.

10. The method of claim 1, wherein the machine learning model comprises a binary classifier machine learning model.

11. The method of claim 1, wherein the similarity score for each feature in the set of two or more features corresponds to a respective similarity function used to determine the similarity score for the pair of name strings at the respective feature level.

12. The method of claim 11, wherein applying machine-learning model against the set of two or more features for the pair of name strings comprises compiling the similarity scores of the set of two or more features into a feature vector based on a predetermined feature vector pattern.

13. One or more non-transitory computer-readable media storing one or more sequences of instructions that, when executed by one or more processors, cause:
executing a query to identify one or more matching name strings that match a query name string; wherein executing the query comprises:
identifying a set of target name strings, from a set of name strings, that are textually similar to the query name string; and
for each given target name string of the set of target name strings:
identifying a set of two or more features, from a plurality of feature levels, for a pair of name strings that comprises the query name string and the given target name string;
wherein the plurality of feature levels comprises two or more of:
a name feature level for comparing the entirety of the query name string to the entirety of the given target name string,
a word feature level for comparing each word in the query name string to each word in the given target name string,
a character feature level for comparing the characters in the query name string to the characters in the given target name string, or
an initial feature level for comparing first letters of the words in the query name string to the first letters of the words in the given target name string;
wherein each feature in the set of two or more features comprises a similarity score corresponding to a respective feature level from the plurality of feature levels;
applying a machine-learning model against the set of two or more features for the pair of name strings to generate output that comprises a matching prediction for the pair of name strings;
returning results from said executing the query.

14. The one or more non-transitory computer-readable media of claim 13, wherein identifying the set of target name strings comprises:
for each name string of the set of name strings, determining a text-based matching score that indicates a degree of textual matching between said each name string and the query name string;
wherein each target name string, of the set of target name strings, is associated with a text-based matching score that is among a threshold number of highest text-based matching scores for name strings of the set of name strings.

15. The one or more non-transitory computer-readable media of claim 13, wherein:
each feature level within the plurality of feature levels has a corresponding set of similarity functions,
the set of features includes a plurality of features for a particular feature level of the plurality of feature levels,
a first feature within the plurality of features for the particular feature level corresponds to a first similarity function within the set of similarity functions, and
a second feature within the plurality of features for the particular feature level corresponds to a second similarity function within the set of similarity functions.

16. The one or more non-transitory computer-readable media of claim 13, wherein:
the plurality of feature levels comprises the name feature level; and
identifying a particular set of features, from the plurality of feature levels, for a particular pair of name strings that comprises the query name string and a particular target name string, of the set of target name strings, comprises:
generating at least one similarity score based on at least one comparison of the whole query name string and the whole particular target name string, and
including the at least one similarity score in the particular set of features.

17. The one or more non-transitory computer-readable media of claim 13, wherein:
the plurality of feature levels comprises the word feature level; and
identifying a particular set of features, from the plurality of feature levels, for a particular pair of name strings that comprises the query name string and a particular target name string, of the set of target name strings, comprises:
generating a plurality of similarity scores based on a plurality of comparisons between words of the query name string and words of the particular target name string,
identifying a set of highest similarity scores of the plurality of similarity scores; and including the set of highest similarity scores in the particular set of features.

18. The one or more non-transitory computer-readable media of claim 13, wherein:
the plurality of feature levels comprises the character feature level; and
identifying a particular set of features, from the plurality of feature levels, for a particular pair of name strings that comprises the query name string and a particular target name string, of the set of target name strings, comprises:
generating at least one similarity score based on at least one comparison of a first set of characters in the query name string and a second set of characters in the particular target name string, and
including the at least one similarity score in the particular set of features.

19. The one or more non-transitory computer-readable media of claim 13, wherein:
the plurality of feature levels comprises the initial feature level; and
identifying a particular set of features, from the plurality of feature levels, for a particular pair of name strings that comprises the query name string and a particular target name string, of the set of target name strings, comprises:
generating at least one similarity score based on at least one comparison of a first set of first letters of words in the query name string and a second set of first letters of words in the particular target name string, and
including the at least one similarity score in the particular set of features.

20. The one or more non-transitory computer-readable media of claim 13, wherein identifying a particular set of features, from the plurality of feature levels, for a particular pair of name strings that comprises the query name string and a particular target name string, of the set of target name strings comprises: using one or more text similarity functions of a group of text similarity functions that includes: Sorensen-Dice similarity, Normalized compression distance (NCD), Damerau Levenshtein distance, Jaro-Winkler, or Longest Common Subsequence.

21. The one or more non-transitory computer-readable media of claim 13, wherein identifying the set of target name strings comprises using fuzzy text-search to scan through the set of name strings and return the set of target name strings that are textually similar to the query name string.

22. The one or more non-transitory computer-readable media of claim 13, wherein the machine learning model comprises a binary classifier machine learning model.

23. The one or more non-transitory computer-readable media of claim 13, wherein the similarity score for each feature in the set of two or more features corresponds to a respective similarity function used to determine the similarity score for the pair of name strings at the respective feature level.

24. The one or more non-transitory computer-readable media of claim 23, wherein applying machine-learning model against the set of two or more features for the pair of name strings comprises compiling the similarity scores of the set of two or more features into a feature vector based on a predetermined feature vector pattern.

* * * * *